United States Patent [19]

Gagg et al.

[11] Patent Number: 5,201,554
[45] Date of Patent: Apr. 13, 1993

[54] SWIVEL COUPLING WITH CORRUGATED TUBE, O-RING SEAL AND SPLIT RING CLIP

[75] Inventors: Jonathan W. Gagg, Llangyidr, Wales; Michael J. Daisley, Barnet, England

[73] Assignee: Senior Flexonics Limited, England

[21] Appl. No.: 660,858

[22] Filed: Feb. 26, 1991

[30] Foreign Application Priority Data

Feb. 28, 1990 [GB] United Kingdom ............... 9004487
Sep. 21, 1990 [GB] United Kingdom ............... 9020665

[51] Int. Cl.$^5$ .......................................... F16L 37/088
[52] U.S. Cl. ..................... 285/321; 285/903; 285/305; 285/276
[58] Field of Search ............. 285/903, 321, 305, 272, 285/276, 351

[56] References Cited

U.S. PATENT DOCUMENTS

| 3,215,455 | 11/1965 | Fiala et al. | 285/321 |
| 3,532,367 | 10/1970 | Roos | 285/321 |
| 3,603,619 | 9/1971 | Bengesier | 285/321 |
| 3,637,239 | 1/1972 | Daniel | 285/321 |
| 3,718,350 | 2/1973 | Klein | 285/321 |
| 3,773,360 | 11/1973 | Timbers | 285/321 |
| 3,920,270 | 11/1975 | Babb, Jr. | 285/321 |
| 4,111,464 | 9/1978 | Asano et al. | 285/321 |
| 4,240,654 | 12/1980 | Gladieux | 285/321 |
| 4,437,691 | 3/1984 | Laney | 285/903 |
| 4,904,002 | 2/1990 | Sasa et al. | 285/903 |

FOREIGN PATENT DOCUMENTS

| 14094 | 8/1980 | European Pat. Off. | 285/321 |
| 3831611 | 3/1990 | Fed. Rep. of Germany | 285/321 |
| 2122057 | 7/1972 | France . | |
| 2482251 | 5/1980 | France . | |
| 2043195 | 10/1980 | United Kingdom . | |
| 2230582 | 10/1990 | United Kingdom . | |
| 9013768 | 11/1990 | World Int. Prop. O. . | |

Primary Examiner—Eric K. Nicholson
Attorney, Agent, or Firm—Shlesinger Arkwright & Garvey

[57] ABSTRACT

A fluid tight coupling arrangement is provided for a corrugated tube 5 comprising a coupling member 1, for example, a manifold or end connector, having a cylindrical recess 2 in which a corrugated tube end is adapted to be received, an "O" ring seal 9 in the recess between the tube 5 and the inside of the recess 2, and a radially expandable split ring spring clip 6 which is engageable with a corrugation of the tube 5 and with an abutment 8 in the recess 2 for retaining the end of the tube 5 in the recess 2 (FIG. 1).

12 Claims, 2 Drawing Sheets

SWIVEL COUPLING WITH CORRUGATED TUBE, O-RING SEAL AND SPLIT RING CLIP

This invention relates to coupling arrangements and more especially to coupling arrangements for making a fluid tight coupling to corrugated tubing.

In U.K. Patent Application No. 8907113.8 there is described a method of making a fluid tight coupling to corrugated tubing in which a coupling member is fitted over the end of the corrugated tubing and preferably is provided with two rolling action circumferential grooves which radially compress the coupling member into contact with the corrugated tubing to effect the necessary seal. It has been found that a coupling produced by this method is very effective. In the arrangement described in U.K. Patent Application No. 8907113.8, the end of the coupling member remote from the corrugated tubing is provided with an external thread which enables a screwed connection to be made to the coupling member.

One especially envisaged use of such a fluid tight coupling arrangement is in domestic gas installations and especially in a new form of gas installation which is presently being considered. Usually in a domestic dwelling a gas pipe is run into the dwelling to a gas meter and a gas pipe is run from the meter to the various positions where a gas outlet is required, all but the last gas outlet being provided by making a "T" connection to the gas pipe.

A new central distribution system is presently being considered in the U.K. and in some overseas countries in which a gas pipe is still run to a gas meter, but the gas is then run to a central location in the dwelling where a multi-outlet gas manifold is located. Individual gas pipes are then run form the gas manifold to each of the positions where a gas outlet is required. In this type of installation it is advantageous to use corrugated tubing for the pipe runs.

The threaded connection on the coupling arrangement described in U.K. Patent Application No. 8907113.8 was designed to be screwed into a gas manifold of such a central distribution system and, possibly, into the gas meter as well. However, it has been found that when installing such a system, it is advantageous to provide the fluid tight coupling arrangement with a swivel facility and this has been achieved by providing a smooth end to the coupling member in place of the threaded end and by using a conventional 3-part compression fitting to couple the smooth end of the corrugated tube coupling member to the gas manifold or to the gas meter as the case may be. Whilst such an arrangement enables the required swivel feature to be obtained, it has been found that is a very time consuming system to install and is also very bulky and expensive and is not vandal proof.

It is an object of the present invention to provide an improved fluid tight coupling for corrugated tubing, whereby these disadvantages are at least partially alleviated.

According to the present invention there is provided a coupling arrangement for corrugated tube comprising a coupling member having a cylindrical recess in which a corrugated tube end is adapted to be received, an "O" ring seal in said recess between said tube and the inside of said recess, and radially expandable means, preferably a split ring spring clip, disposed in a corrugation of said tube and engageable with an abutment in said recess for retaining the end of said tube in said recess.

It may be arranged that the "O" ring seal is disposed within a corrugation of said tube.

In a preferred arrangement for carrying out the invention it may be arranged that said "O" ring seal is disposed in a corrugation of said tube which is further from the end of said tube than the corrugation in which said spring clip is disposed.

Advantageously a further "O" ring seal may be provided disposed within a further corrugation of said tube in said recess, the "O" ring seal or seals being of circular or other cross-section, and a further split ring clip may be provided disposed in a further corrugation of said tube which is near the entrance of said recess, for supporting said tube in said recess.

An annular bush, which is conveniently wedge shaped, may also be provided which is inserted in the entrance of said recess and between said tube and the inside of said recess for supporting said tube in said recess.

In carrying out the invention, it may be arranged that said abutment is constituted by a circumferential groove on the inside of said recess, or said recess is provided with an increased diameter portion remote from the entrance thereof, said abutment being constituted by a shoulder formed thereby.

In a preferred arrangement for carrying out the invention, it may be arranged that said spring clip is radially compressed in said corrugation against its spring action as the end of said tube is inserted in said recess, and radially expands under spring action into said circumferential groove or said increased diameter portion to retain said tube in said recess.

Conveniently said recess may be provided with a lead-in taper to facilitate compression of said spring clip as it is inserted in said recess.

The coupling member may take the form of an end coupling member, which may be a turned part or a pressing, or may take the form of a multi-outlet manifold, a "T" coupling, a straight coupling, or a direct coupling to a device.

Some exemplary embodiments of the invention will now be described reference being made to the accompanying drawings, in which.

Figure 1:
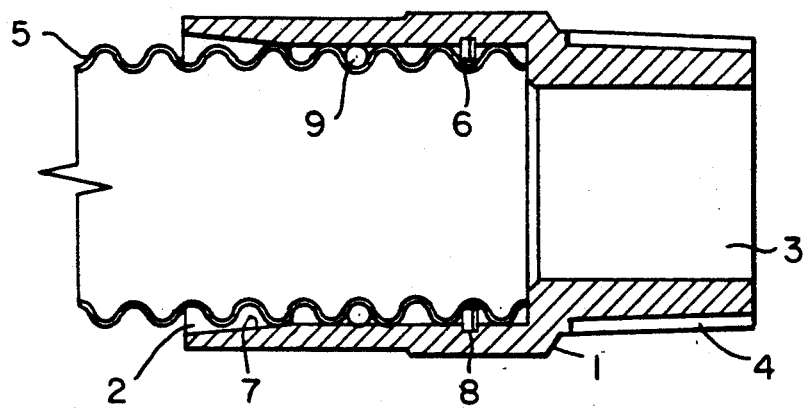
FIG. 1, is a cross-sectional view of a fluid coupling arrangement i accordance with the present invention in the form of a corrugated tube end coupling.

In FIG. 1 of the drawings there is shown one embodiment of the invention as applied to a corrugated tube end connector type coupling arrangement for use in gas distribution systems. The coupling arrangement shown comprises a tubular connector 1 which is provided at one end with a cylindrical recess 2 and at the other end with a connecting through bore 3. The end adjacent the through bore 3 is provided with an external thread 4 for attachment purposes.

The recess 2 in the end connector 1 is adapted to receive the end of a corrugated tube 5. The corrugated tube 5 is retained in the recess 2 by means of a radially expandable split ring spring clip 6 e.g. a circlip, which is positioned on the tube 5, typically in the last corrugation, and which is radially compressed as the tube 5 is inserted in the recess 2, this being aided by a lead-in taper 7. The recess 2 is provided on its inside wall with a circumferential groove 8 into which the spring clip 6 radially expands as the tube 5 is inserted in the recess 2, and which prevents the tube 5 from being withdrawn from the recess 2. In order to provide a fluid (e.g. gas) tight seal between the corrugated tube 5 and the recess 2, an "O" ring seal 9 is provided, disposed typically in the third corrugation of the tube 5, which is compressed between the tube 5 and the wall of the recess 2.

It has been found that such a corrugated tube coupling provides the required gas tight seal between the corrugated tube 5 and the connector 1, and is relatively cheap to implement, easy to install, and is substantially taper proof since it is virtually impossible to remove the tube 5 once it has been inserted int the recess 2 and the split ring 6 engages with the retaining groove 8. It has also been found that the corrugated tube coupling described permits a limited swivel action to be obtained and also provides for electrical continuity between the corrugated tube 5 and the connector 1 which is important in domestic dwelling installations.

It will be appreciated that the spring clip 6 and the "O" ring 8 may be disposed in any of the corrugations of the corrugated tube 5, but it is advantageous that the spring clip 6 is nearest the end of the tube 5 rather than the "O" ring seal 9 since otherwise the "O" ring seal would need to travel across the groove 8 for the spring clip 6, which could damage the "O" ring seal and could make insertion of the tube 5 in the recess 2 difficult.

Figure 2:
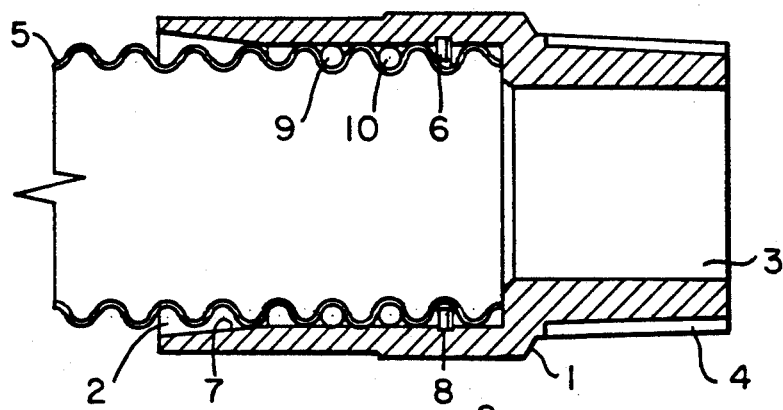
FIGS. 2 to 5, are cross-sectional views illustrating various modifications of the end coupling of FIG. 1.

In some applications it may be considered desirable to incorporate more than one "O" ring seal 9 to ensure a gas-tight seal in extreme environments, and in FIG. 2 of the drawings there is depicted the end coupling of FIG. 1 with a further "O" ring seal 10 provided in the second corrugation of the corrugated tube 5.

Because of the flexible nature of the corrugated tube 5, and because of the difficulty in manufacturing the tube 5 to within precise limits, it is possible for the tube 5 to be a fairly loose fit in the recess 2 of the connector 1. In some extremes of temperature this can lead to the gas-tight seal afforded by the "O" ring seal not meeting required specification levels. In order to alleviate this problem it has been found advantageous to provide some means of supporting the tube 5 in the recess 2.

Figure 3:
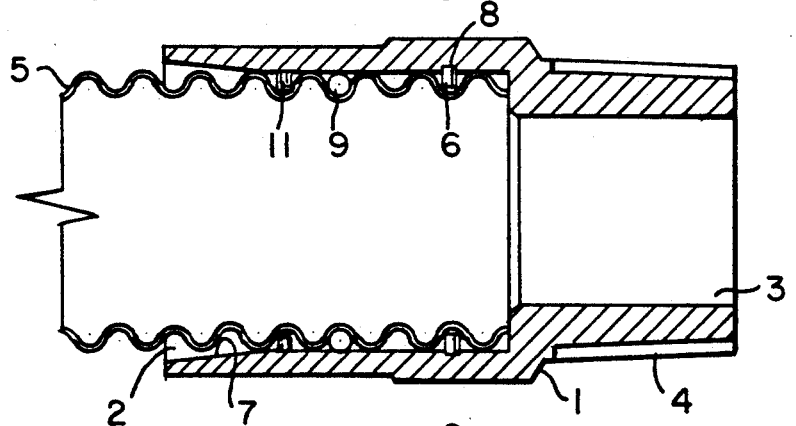

In FIG. 3 of the drawings there is depicted the end coupling of FIG. 1 with an additional split ring "C" clip 11 disposed in the fourth groove of the corrugated tube 5. The "C" clip 11 is sprung over the tube 5 before assembly to locate in the appropriate corrugation and is arranged to have an outside diameter which is a close fit in the recess 2 to thereby support the tube 5 in the recess 2 against lateral movement.

Figure 4:
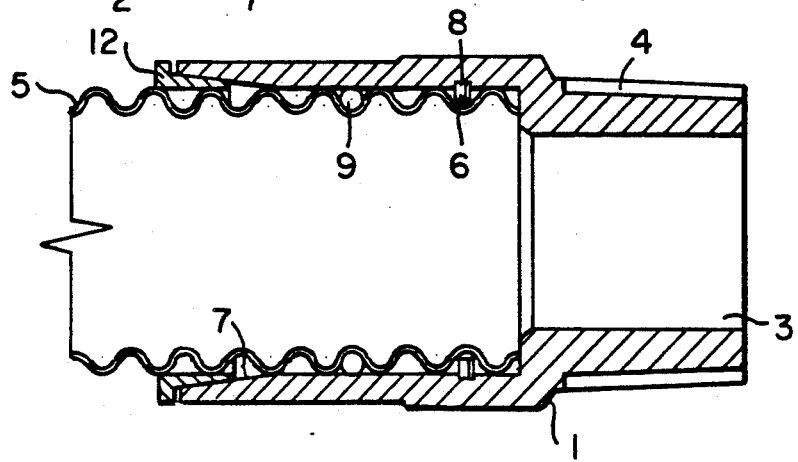

In FIG. 4 of the drawings there is depicted an alternative way of doing this in which an annular, wedge shaped, bush 12 is positioned on the tube 5 and is inserted into the gap in the recess 2 between the tube 5 and the wall of the recess 2. This again supports the tube 5 against lateral movement.

Figure 5:
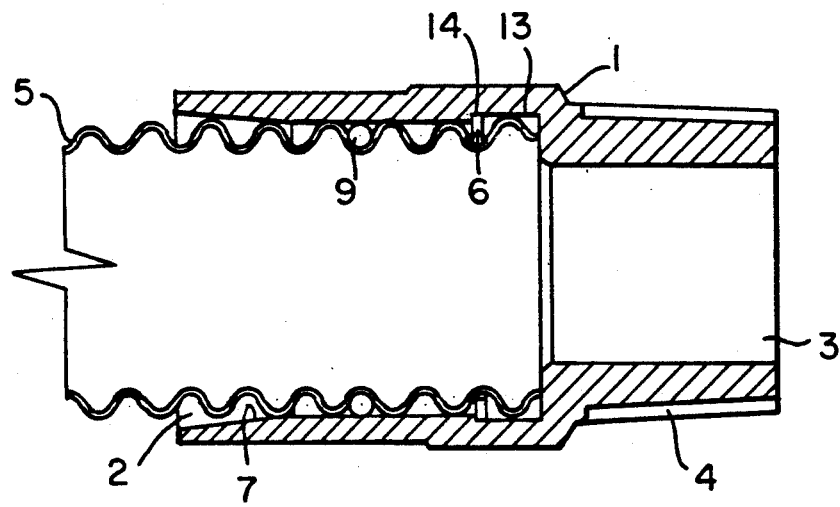

In FIG. 5 of the drawings there is depicted a modification of the end coupling of FIG. 1 which obviates the need for the circumferential groove 8 in the wall of the recess 2. In FIG. 5, the recess 2 is provided at its inside end with an increased diameter portion 13 which affords an abutment 14 between the two different diameter portions. As the tube 5 is inserted in the recess 2 with the spring clip 6 in its radially compressed state, when the spring clip 6 enters the increased diameter portion 13, it radially expands and is prevented form being subsequently withdrawn by the shoulder 14. It has been found that the configuration of FIG. 5 is especially suitable for end couplings which are formed as pressings.

Figure 6:
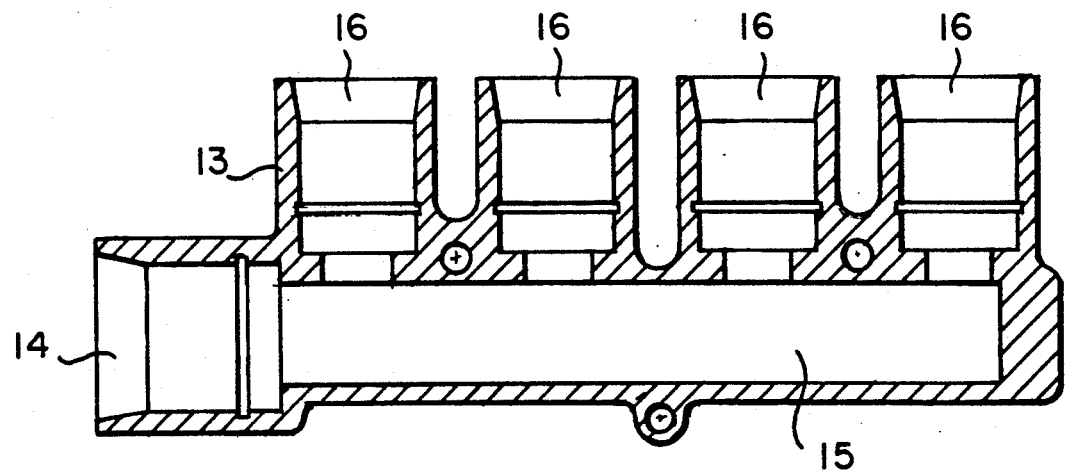
FIG. 6, is a cross-sectional side view of an alternative form of fluid coupling arrangement in accordance with the present invention in the form of a central gas distribution manifold.

In FIG. 6 of the drawings there is shown a further embodiment of the present invention in the form of a central gas distribution manifold 13. The manifold 13, which may typically be of brass or stainless steel, is provided with an inlet recess 14, a connecting bore 15, and four outlet recesses 16. The inlet recess 14 and outlet recesses 16 are each adapted to receive the end of a corrugated tube (not shown) as has been described with reference to the recesses 2 of the end connectors 1 of FIGS. 1 to 4.

It should be appreciated that the embodiments which have been described have been given by way of example only and may be modified dependent upon any particular application. For example, although in the embodiments described use is made of a spring clip 6 to retain the tube 5 in the recess 2, other forms of retention, such as a close-would helical spring, could be used. Also, although a spring clip of rectangular cross-section has been used, other cross-sections e.g. circular or oval could be used, and although "O" rings 9 and 10 of circular cross-section have been used, other cross-sections e.g. oval, square, D-shaped, etc. could be used.

Although the embodiments of the invention have been described for effecting a gas-tight coupling between a corrugated tube and an end coupling or a manifold, it should be appreciated that the coupling member described is applicable to other corrugated tube couplings e.g. "T" couplings and straight couplings, and also to direct couplings to devices or appliances such as gas meters, etc. The invention is also applicable to other fluid couplings such as, for example, for use in domestic water and central heating applications, fire sprinkler system in aircraft, etc., and the cooling and hydraulic control systems associated with internal combustion engines, in which, for example, the coupling member is constituted by the actual I/C engine and corrugated tube couplings are made directly to recesses in the engine body.

We claim:

1. A coupling arrangement for providing a fluid tight swivel coupling between two fluid carrying members comprising:

a first fluid carrying member in the form of a continuously corrugated tube;

a second fluid carrying member having a cylindrical recess of substantially the same diameter as the largest outside diameter of said tube so that an end of said tube may be telescopically received within said recess, said second member having a grooved abutment formed in said recess;

a radially expandable split ring clip disposed in a corrugation of said tube adjacent the end thereof to engage with said abutment to retain said tube within said recess; and an o-ring seal disposed in a corrugation of the end portion of said tube spaced further from the end than said split ring to provide a fluid tight seal between said tube and the inner wall of said recess, whereby said coupling can be permanently assembled by merely manually inserting said tube end into said recess until said ring expands radially outwardly to engage said abutment.

2. An arrangement as claimed in claim 1, comprising a further "O" ring seal disposed within a further corrugation of said tube in said recess.

3. An arrangement as claimed in claim 1, in which said "O" ring seal is of circular cross-section.

4. An arrangement as claimed in claim 1, comprising a further split ring clip disposed in a further corrugation of said tube which is near the entrance of said recess, for supporting said tube in said recess.

5. An arrangement as claimed in claim 1, further including an annular bush which is inserted in the entrance of said recess and between said tube and the inside of said recess for supporting said tube in said recess.

6. An arrangement as claimed in claim 5, in which said annular bush is wedge shaped.

7. An arrangement as claimed in claim 1, in which said abutment is constituted by a circumferential groove on the inside of said recess.

8. An arrangement as claimed in claim 1, in which said recess is provided with an increased diameter portion remote form the entrance thereof, said abutment being constituted by a shoulder formed thereby.

9. An arrangement as claimed in claim 7, in which said spring clip is radially compressed in said corrugation against its spring action as the end of said tube is inserted in said recess, and radially expands under spring action into said circumferential groove or said increased diameter portion to retain said tube in said recess.

10. An arrangement as claimed in claim 9, in which said recess is provided with a lead-in taper to facilitate compression of said spring clip as it is inserted in said recess.

11. An arrangement as claimed in claim 1, in which the coupling member takes the form of an end coupling member.

12. An arrangement as claimed in calm 1, in which the coupling member takes the form of a multi-outlet manifold, a straight coupling, or a direct coupling to a device.

* * * * *